United States Patent [19]

Takahashi et al.

[11] Patent Number: 5,081,614
[45] Date of Patent: Jan. 14, 1992

[54] MAGNETO-OPTICAL HEAD UTILIZING CENTRAL AND PERIPHERAL PORTIONS OF REFLECTED LIGHT FLUX FOR DIFFERENT PURPOSES

[75] Inventors: Akira Takahashi; Toshihisa DeGuchi, both of Nara; Yoshiteru Murakami, Nishimomiya; Michinobu Mieda, Tenri; Kazuo Van; Kenji Ohta, both of Nara; Hiroyuki Katayama, Ikoma; Tomoyuki Miyake, Tenri, all of Japan

[73] Assignee: Sharp Kabushiki Kaisha, Osaka, Japan

[21] Appl. No.: 577,817

[22] Filed: Sep. 4, 1990

Related U.S. Application Data

[63] Continuation of Ser. No. 73,083, Jul. 14, 1987, abandoned.

[30] Foreign Application Priority Data

Jul. 14, 1986 [JP] Japan ............................. 61-165321
Jul. 18, 1986 [JP] Japan ............................. 61-170545

[51] Int. Cl.$^5$ .................... G11B 7/135; G11B 7/18; G11B 13/04

[52] U.S. Cl. ............................... 369/13; 369/112; 369/110; 369/116

[58] Field of Search ............... 369/13, 112, 110, 116, 369/118; 360/114, 59; 250/204

[56] References Cited

U.S. PATENT DOCUMENTS

| | | | |
|---|---|---|---|
| 4,178,615 | 12/1979 | Shimooka et al. | 369/118 |
| 4,422,168 | 12/1983 | Ito et al. | 250/204 |
| 4,517,666 | 5/1985 | Ando | 369/118 |
| 4,546,460 | 10/1985 | Ando | 369/118 |
| 4,599,714 | 7/1986 | Endo | 369/110 |
| 4,682,311 | 7/1987 | Matsubayashi et al. | 369/13 |
| 4,682,315 | 7/1987 | Uejima | 369/110 |
| 4,754,355 | 6/1988 | Takahashi et al. | 360/114 |

FOREIGN PATENT DOCUMENTS

0075192 9/1982 European Pat. Off.

Primary Examiner—Stuart S. Levy
Assistant Examiner—Hoa Nguyen

[57] ABSTRACT

A magneto-optical head wherein a light flux, which is reflected from a recording medium, is separated into its central portion and remaining portion. The central light flux portion is only used as a magneto-optical signal while the remaining light flux portion is only used as an optical servo signal.

5 Claims, 8 Drawing Sheets

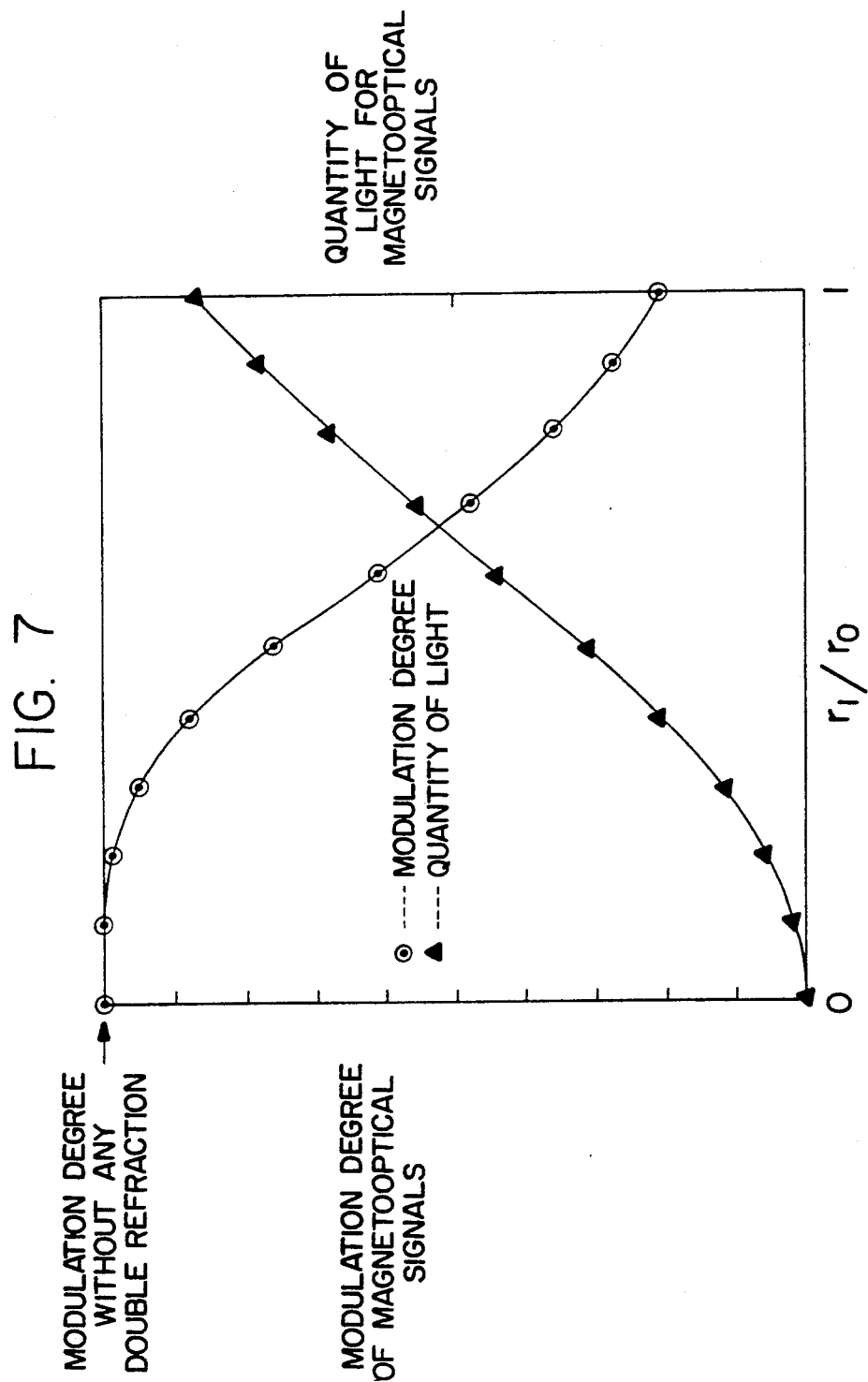

MAGNETO-OPTICAL HEAD UTILIZING CENTRAL AND PERIPHERAL PORTIONS OF REFLECTED LIGHT FLUX FOR DIFFERENT PURPOSES

This application is a continuation of application Ser. No. 07/073,083, filed on July 14, 1987, now abandoned.

BACKGROUND OF THE INVENTION

The present invention relates to an optical head for recording, reproducing or erasing information in an optical memory device by irradiating a laser beam to a storage medium. And the invention further relates to a magnetooptical head for recording information in a magnetooptical memory device for reproducing or erasing the recorded information by irradiating a laser beam to a storage medium which is composed of a magnetic thin film.

It has been observed recently that the use of an optical disk or magnetooptical disk as a large-capacity memory device is attracting much attention. The substrate of such optical or magnetooptical disk is generally composed of glass or plastic material. And it is customary that acrylic or polycarbonate plastic is employed in most cases due to remarkable merits thereof in both productivity and handling facility. However, such plastic substrate has some disadvantages in the points that, as compared with a glass substrate, double refraction is prone to occur (particularly in polycarbonate) and the optical characteristics are inferior. Such occurrence of double refraction is liable to be induced especially in a plastic substrate produced by injection molding.

For reproducing signals in any optical disk of reproduction-only type, DRAW type or erasable type based on phase transition, there is adopted a technique of eliminating return light to a laser diode (LD) through an optical isolater which is constituted by a combination of a polarized beam splitter (PBS) and a quarter wavelength plate. The light emitted from the laser diode is passed through the polarized beam splitter so that P-wave light alone is linearly polarized and, in a structure where the optical axis of the quarter wavelength plate is set to form an angle of 45 degrees with the oscillation surface, the linearly polarized light is converted into circularly polarized light before being incident upon the substrate. The reflected light is passed through the quarter wavelength plate again to become S-wave linearly polarized light, which is then introduced to a photo detector by the beam splitter without being returned to the laser diode.

However, if double refraction takes place in the substrate, the light reflected from the substrate is elliptically polarized and therefore fails to become linearly polarized light even after passage through the quarter wavelength plate, whereby return light to the laser diode is generated to consequently bring about a problem that the quantity of light introduced to the photo detector is reduced.

Meanwhile in a magnetooptical disk, signal reproduction is performed by the use of linearly polarized light. And in case there is existent such double refraction in the substrate of the disk, the linearly polarized light is harmfully affected by elliptical polarization to eventually cause considerable deterioration of the reproduced signal quality.

SUMMARY OF THE INVENTION

The present invention has been accomplished in view of the problems mentioned above. Its first object resides in providing an improved optical head which ensures high-quality signal reproduction even by the use of a plastic substrate.

And another object of the invention is to provide an improved magnetooptical head which is capable of reproducing high-quality signals despite the use of a plastic substrate.

Still other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

In order to achieve the above objects, according to an embodiment of the present invention, an optical head for recording, reproducing or erasing information in an optical memory device by irradiating a laser beam to a storage medium is equipped with a filter inserted in an optical system of a signal detecting section to cut an outer portion of a light flux at least partially.

By insertion of such a filter in the optical system of the signal detecting section to cut an outer portion of a light flux at least partially, elliptically polarized light generated in the outer portion of the light flux is cut so that circularly polarized light in the central portion is taken out to an optical signal detection system, whereby reproduced signals of satisfactory quality can be obtained.

To achieve the above objects, according to another embodiment of the present invention, a magnetooptical head for recording information in a magnetooptical memory device or reproducing or erasing the recorded information by irradiating a laser beam to a storage medium of a magnetic thin film is equipped with a means for separating the light flux from the storage medium into its central portion and remaining portion, so as to use the central light flux portion as a magnetooptical signal while using the remaining light flux portion as an optical servo signal.

Thus, the light flux from the recording medium is separated by such means into a central portion and a remaining portion, and the central light flux portion is used as a magnetooptical signal while the remaining light flux portion is used as an optical servo signal. Consequently, relative to the double refraction induced in the disk substrate, the central light flux portion is substantially kept free from harmful influence of the double refraction perpendicular to the substrate, thereby preventing deterioration of the reproduced signal quality.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6 (b) is a side view showing a partial vicinity of a magnetooptical disk;

FIG. 7 graphically shows curves representing the degree of modulation; and

DETAILED DESCRIPTION OF THE INVENTION

In advance of describing the preferred embodiments of the present invention, an explanation will first be given of double refraction in a disk substrate.

Double refraction occurring in the substrate of an optical or magnetooptical disk is classified into two types: one type is in the direction of the substrate plane and the other type is in the direction perpendicular thereto. The former in-plane double refraction occurs when there exists a difference between refractive indexes in two mutually different directions within the substrate plane, and it affects polarized light equally at any position of the light flux. The latter perpendicular double refraction occurs when there is a difference between a refractive index in the direction perpendicular to the substrate and a refractive index in the direction of the plane, and it causes a varied effect on the polarized light depending on the position of the light flux. Since the central light flux portion is incident upon the substrate substantially perpendicularly, the light flux is affected merely by the in-plane double refraction while being almost unaffected by the perpendicular double refraction. In contrast therewith, the outer light flux portion incident upon the substrate obliquely is affected by the perpendicular double refraction as well as by the in-plane double refraction. Where the direction of the incident polarized light is parallel or perpendicular to the plane of incidence, the linearly polarized light remains unchanged.

In a polycarbonate substrate produced by injection molding, it is usual that in-plane double refraction is on the order of $10^{-6}$ while perpendicular double refraction is on the order of $10^{-4}$ which is greater by two figures than the value of the in-plane double refraction. Therefore, elimination of the undesired polarization caused by the double refraction in the substrate is attained principally by improving the perpendicular double refraction.

It is assumed in the following that two orthogonal directions in the substrate plane are defined as an x-axis and a y-axis respectively, and a direction perpendicular to the substrate is defined as a z-axis. Then the refractive index $n_s$ in the direction perpendicular to the plane of incidence is expressed as $$n_s = 1/\sqrt{\sin^2\alpha/n_x^2 + \cos^2\alpha/n_y^2} \qquad 1$$

where $n_x$, $n_y$ and $n_z$ are refractive indexes in the x-axis, y-axis and z-axis directions respectively; $\alpha$ is the angle formed by the x-axis with the plane of incidence; and $\theta$ is the angle of refraction.

Meanwhile, the refractive index $n_p$ in the direction of the plane of incidence is expressed as $$n_p = 1/\sqrt{\cos^2\theta(\cos^2\alpha/n_x^2 + \sin^2\alpha/n_y^2) + \sin^2\theta/n_z^2} \qquad 2$$

Figure 4A:
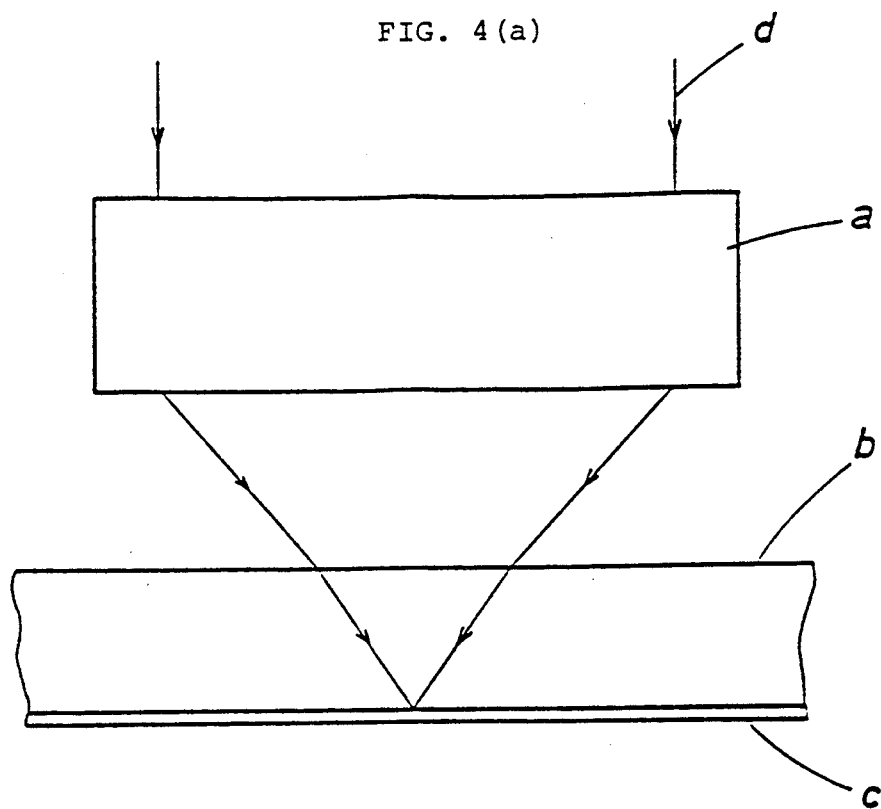
FIGS. 4 (a) and 4 (b) are a side view and a plan view respectively showing a partial vicinity of an optical disk.
Figure 4B:
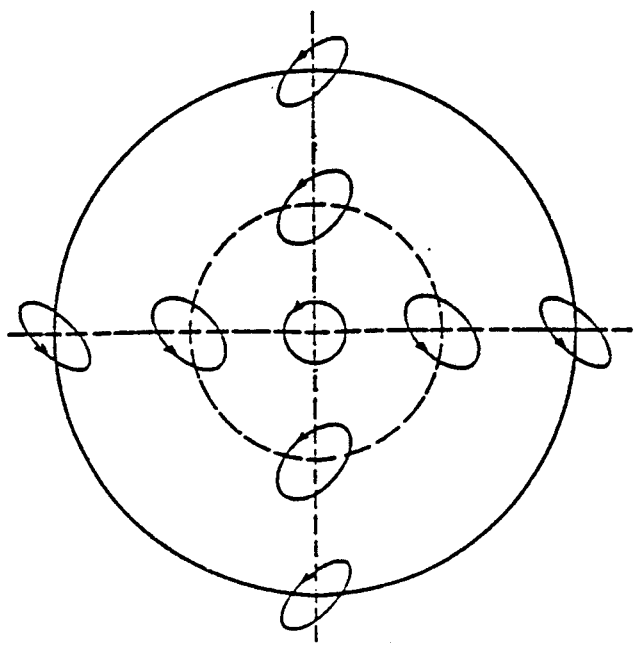

Assume now that light linearly polarized in the x-axis direction is incident upon a disk with the values of $n_s$ and $n_p$ calculated from Eqs. 1 and 2 respectively. FIGS. 4 (a) and (b) show the state of polarization of reflected light at individual positions of the light flux in an optical disk. And FIGS. 6 (a) and (b) show such state of polarization in a magnetooptical disk.

First a description will be given on an optical disk which serves as an optical memory device. FIG. 4 (a) is a side view of a partial vicinity of an optical disk, where there are shown a condenser lens a, a plastic substrate b, a recording medium c, and a light beam d. FIG. 4 (b) is a plan view of FIG. 4 (a) and shows the state of polarization of reflected light at individual positions of a light flux. In FIG. 4 (b), the circularly polarized light remains unchanged in the central light flux portion, but the ellipticity becomes gradually smaller with displacement toward the outer portion and thereby causes an increase in the quantity of return light to the laser diode, whereby the quantity of light introduced to the photo detector is reduced.

Hereinafter an exemplary embodiment of the present invention for an optical memory device will be described with reference to the accompanying drawings.

Figure 1:
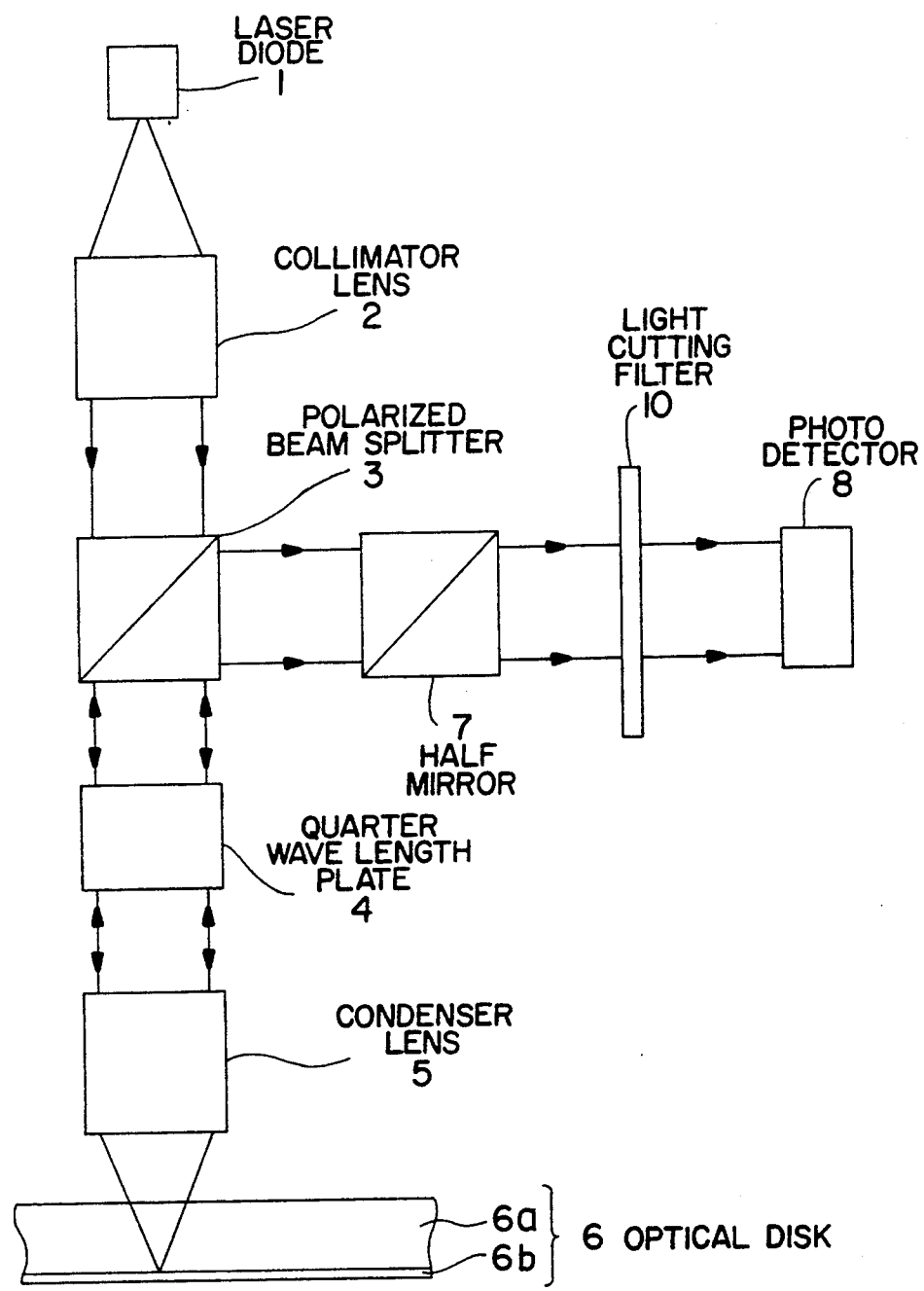
FIG. 1 is a schematic block diagram of a reproducing optical system in an embodiment of the present invention for an optical memory device.

FIG. 1 is a schematic block diagram of an optical head of the present invention to be used for an optical memory device.

In this diagram, there are shown a laser diode (LD) 1, a collimator lens 2, a polarized beam splitter 3, a quarter wavelength plate 4 with its optical axis set at an angle of 45 degrees, a condenser lens 5, an optical disk 6 consisting of a polycarbonate substrate 6a and a recording medium 6b, a half mirror 7, and a photo detector 8.

In the above structure, reflected light from the optical disk 6 is divided by the half mirror 7 into a component for an optical servo system and a component for an optical signal detection system, and the light flux of the latter component is fed to the photo detector 8. The output of the detector 8 is then obtained as a reproduced signal.

In the present invention, a light cutting filter 10 composed of a nontransparent material such as metal, paper or plastic is inserted between the half mirror 7 and the photo detector 8 so as to cut an outer portion of the light flux at least partially. The light cutting filter 10 serves to cut the elliptically polarized portion of the light flux.

Figure 2:
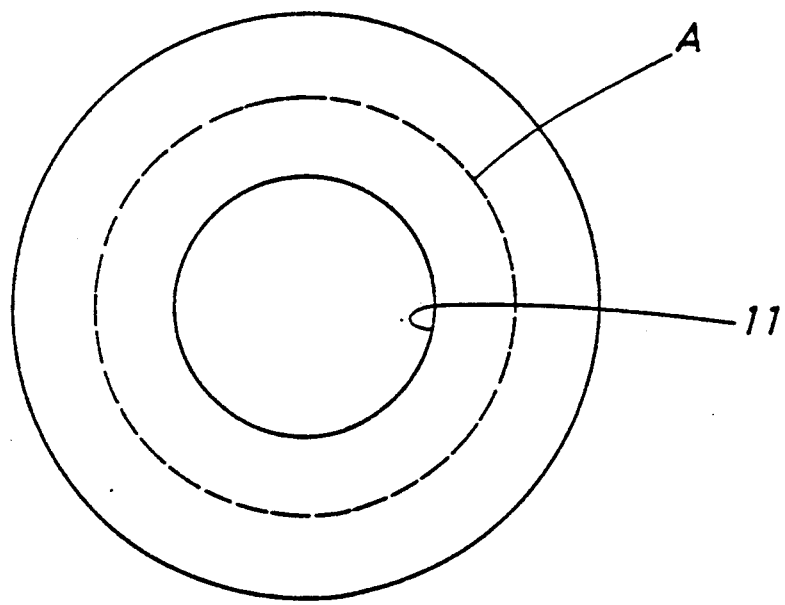
FIG. 2 is a plan view showing the shape of a light cutting filter.

FIG. 2 illustrates the shape of such light cutting filter 10. It is formed with a circular through-hole 11 having a diameter smaller than the outer diameter A of the light flux represented by a dotted line at the center, so as to cut an outer portion of the light flux where the ellipticity is small.

Generally the quantity of the signal light is reduced when the reflected light from the optical disk 6 is elliptically polarized, and the quantity of the return light to the laser diode 1 is increased. As a result, noise included in the signal is increased and thus eventually deteriorates the signal-to-noise ratio.

Figure 3:
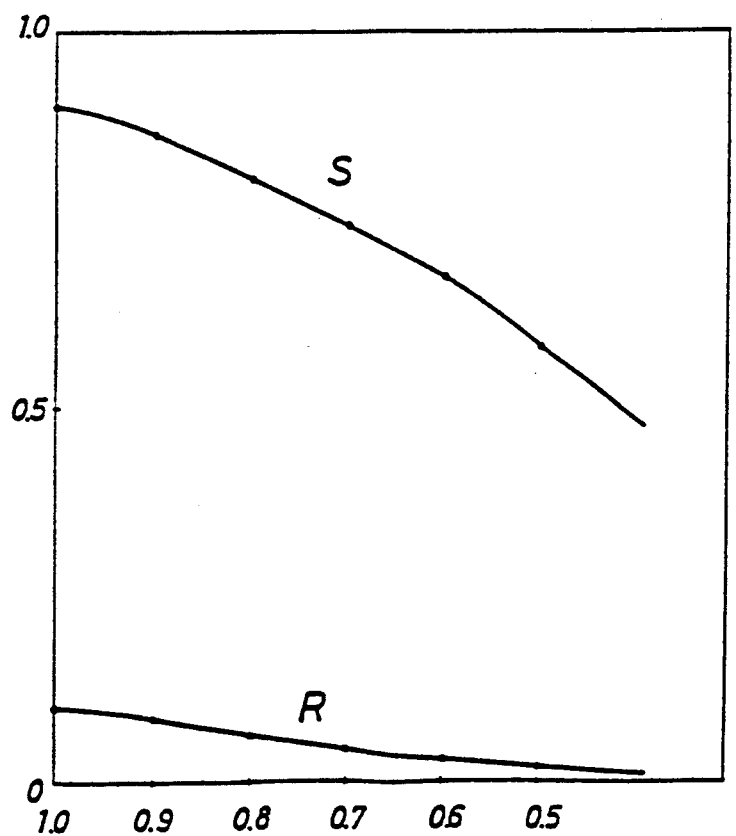
FIG. 3 graphically shows the characteristics representative of reduction caused in a quantity of return light by the light cutting.

FIG. 3 graphically shows changes in both the signal light S from the polycarbonate substrate 6a and the return light R to the laser diode 1, wherein the area ratio of the through-hole 11 to the light beam is plotted along the abscissa, and the quantity of the signal light is plotted along the ordinate on the basis of a value 1 which is obtained in an exemplary case of using a glass disk. The conditions in FIG. 3 are such that the lens has a numerical aperture (NA) of 0.5, and the polycarbonate substrate 6a has a refractive index of $n_o = 1.585$ in the x-axis direction, a refractive index of $(n_o + 5 \times 10^{-6})$ in the y-axis direction and a refractive index of $(n_o - 6 \times 10^{-4})$ in the z-axis direction. From the above graphic representation, it is seen that the return light to the laser diode 1 is remarkably reduced in quantity by cutting the light flux portion where the ellipticity is small. In this case the signal light S is also reduced in quantity, but its absolute value is merely on the order of several $\mu w$ which is substantially free from causing deterioration of the signal-to-noise ratio.

In the embodiment mentioned above, the light flux is partially cut by the filter 10 after being divided by the half mirror 7 into a component for the servo system and a component for the signal detection system. However, similar effect is also attainable by dividing the light flux, instead of such partial cutting, into the portion with a small ellipticity for the servo system and the remaining portion for the signal detection system, and still it is possible to diminish reduction of the signal light in quantity.

As described hereinabove, according to the optical head of the present invention, reproduced signals of high quality can be obtained even by the use of a plastic substrate where double refraction is prone to occur.

Another preferred embodiment of the present invention is described below with regard to an exemplary case of applying the invention to a magnetooptical memory device.

The magnetooptical head of this embodiment is equipped with a means for separating a light flux, which is reflected from a recording medium, into its central portion and remaining portion, wherein the central light flux portion is used as a magnetooptical signal while the remaining light flux portion is used as an optical servo signal.

When a signal is actually read out from a magnetooptical disk, a laser light beam is condensed through a substrate by a condenser lens having a numerical aperture (NA) of 0.5 to 0.6. In this stage, if there occurs double refraction in the substrate, the linearly polarized light incident thereon is elliptically polarized during its passage through the substrate.

Figure 6A:
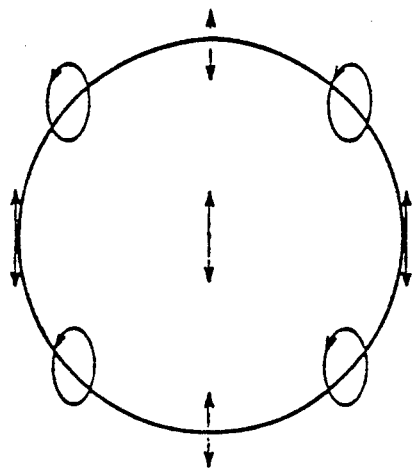
FIG. 6 (a) illustrates how reflected light is polarized when linearly polarized light is incident.
Figure 6B:
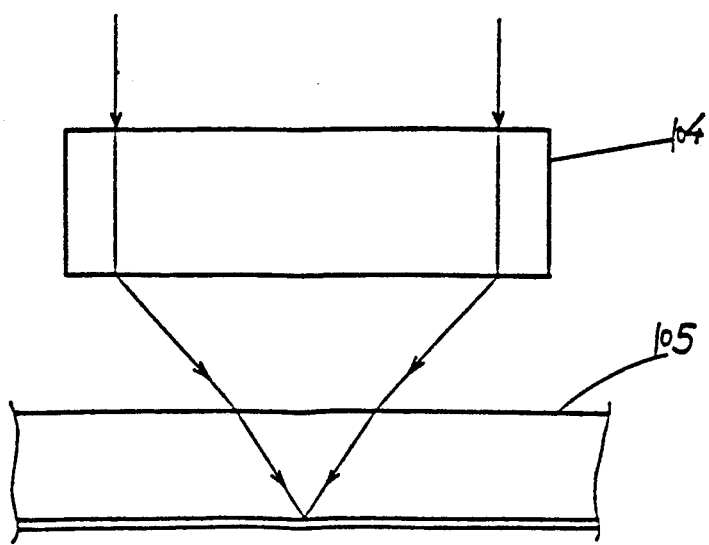

FIG. 6 (b) is a side view showing a partial vicinity of a magnetooptical disk 105, and FIG. 6 (a) is a plan view thereof showing how a reflected light flux is polarized at individual positions. In FIG. 6 (a), linearly polarized light remains unchanged on the axis, while the ellipticity becomes gradually greater toward the outer portion from the axis in the direction to form an angle of 45 degrees, hence deteriorating the reproduced signal quality. Therefore, high-quality signal reproduction can be attained by using merely the central portion of the light flux as a magnetooptical signal.

Figure 5:
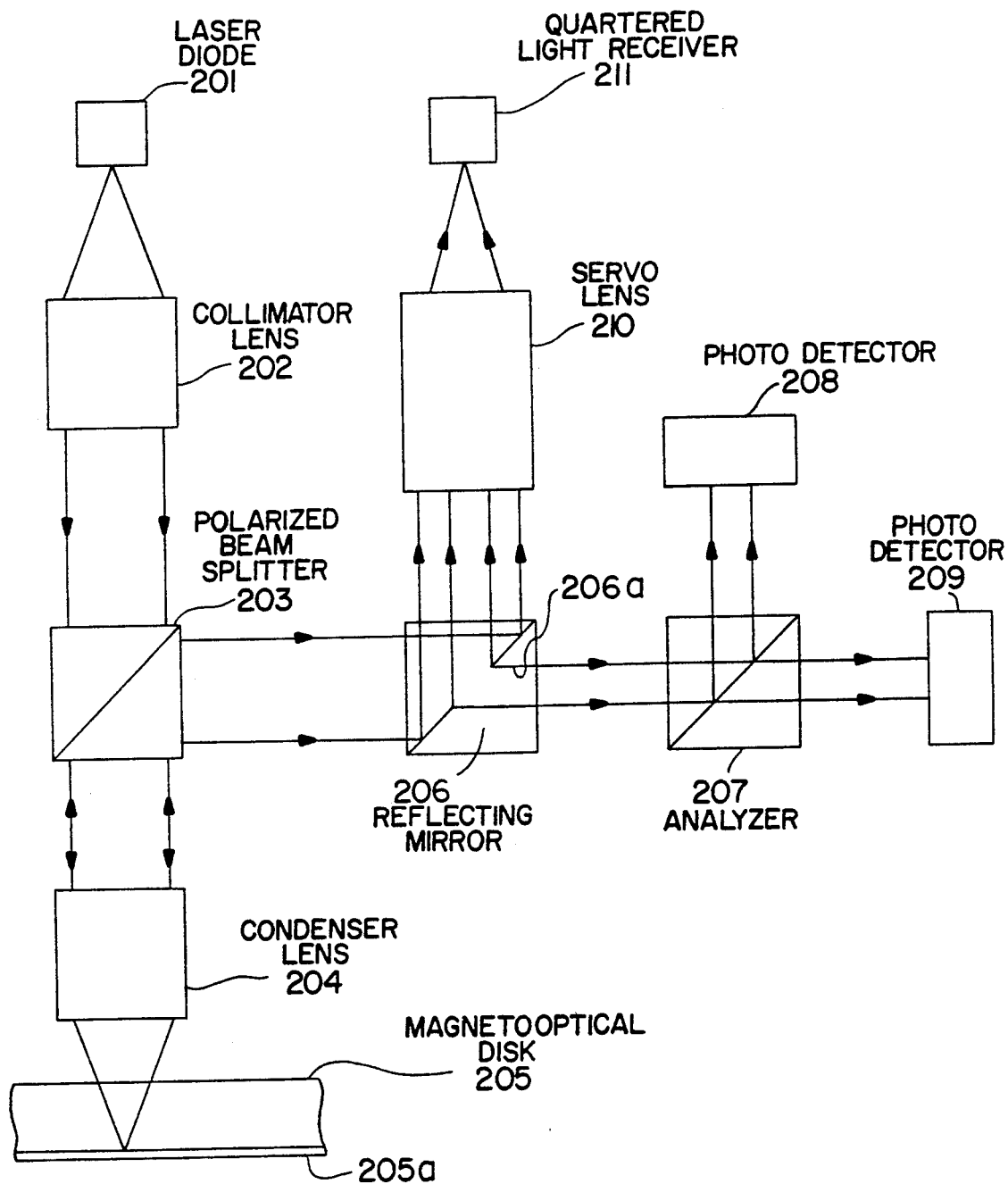
FIG. 5 is a schematic block diagram of a reproducing optical system in the present invention for a magnetooptical memory device.

FIG. 5 is a schematic block diagram of a reproducing optical system in a magnetooptical head of the present invention.

In this block diagram, there are shown a laser diode 201, a collimator lens 202, a polarized beam splitter 203, a condenser lens 204, a magnetooptical disk 205 having a magnetic thin film 205a as a storage medium, a reflecting mirror 206, an analyzer 207, photo detectors 208 and 209, a servo lens 210, and a quartered light receiver 211.

According to the present invention, a central portion of a light flux reflected from the magnetooptical disk 205 is passed through the reflecting mirror 206 to be used as a magnetooptical read signal, while the remaining outer portion of the light flux is reflected by the mirror 206 to be used as an optical servo signal.

Figure 8:
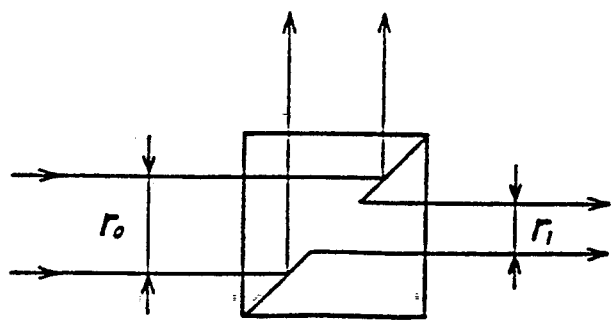
FIG. 8 shows the structure of a reflecting mirror.

FIG. 7 graphically shows the result of calculation of the modulation degree. It is seen therefrom that, if 30 percent or so of the reflected light is used as a magnetooptical signal, then the modulation degree becomes about 80 percent of the reference value in the case without any double refraction and is therefore sufficient for practical operation. In this graphic representation, $r_0$ is the diameter of a light flux incident upon the reflecting mirror 206, and $r_1$ is the diameter of a light flux passed through the opening 206a in the reflecting mirror 206. (Refer to FIG. 8)

As described hereinabove, according to the magnetooptical head of the present invention, high signal quality can be attained even by the use of a plastic substrate.

The first embodiment mentioned may be applied also to a magnetooptical disk, and similarly the second embodiment may be applied to an optical disk as well.

While only certain embodiments of the present invention have been described, it will be apparent to those skilled in the art that various changes and modifications may be made therein without departing from the spirit and scope of the present invention as claimed.

What is claimed is:

1. A magneto-optical system comprising:
   a magneto-optical disk including a substrate having double refraction characteristics and a storage medium;
   means for directing a laser light beam onto said magneto-optical disk; and
   means for directing light flux reflected from said magneto-optical disk through said substrate to reflecting mirror means, the reflected light flux receiving the influence of double refraction;
   said reflecting mirror means separating a central portion of the reflected light flux from an outer portion of the reflected light flux;
   said reflecting mirror means directing the outer portion to first means;
   said first means using only the outer portion as an optical servo signal;
   said reflecting mirror means directing the center portion to second means;
   said second means using only the center portion as a magneto-optical read signal;
   said reflecting mirror means compensating for distortion in the reflected light flux due to double refraction.

2. The magneto-optical system as claimed in claim 1 wherein said first means includes a servo lens and a quartered light receiver.

3. The magneto-optical system as claimed in claim 1 wherein said second means includes an analyzer and photo detectors.

4. A magneto-optical head for use in recording, reproducing, or erasing information in a magneto-optical memory device having a disk with a substrate having double refraction characteristics by irradiating a laser beam through said substrate to a storage medium in the disk, the magneto-optical head comprising:

separation means for separating a reflected laser beam from said medium into a central portion and a peripheral portion;

central portion means for directing said central portion to an information signal reproduction photodetector; and peripheral portion means for directing said peripheral portion to an optical servo signal detector;

said separation means eliminating distortion in a portion of the reflected laser beam utilized to produce said information signal due to double refraction.

5. The magneto-optical head as claimed in claim 4 wherein said central portion means includes an analyzer which passes only said central portion.

* * * * *

UNITED STATES PATENT AND TRADEMARK OFFICE
CERTIFICATE OF CORRECTION

PATENT NO. : 5,081,614

DATED : January 14, 1992

INVENTOR(S) : Takahashi et al.

It is certified that error appears in the above-identified patent and that said Letters Patent is hereby corrected as shown below:

Title page:
  Item [75] In the Inventors' Section:

Change "Toshihisa DeGuchi" to --Toshihisa Deguchi--

Change "Nishimomiya" to --Nishinomiya--

Signed and Sealed this

Fifteenth Day of June, 1993

Attest:

MICHAEL K. KIRK

*Attesting Officer*     *Acting Commissioner of Patents and Trademarks*

UNITED STATES PATENT AND TRADEMARK OFFICE
CERTIFICATE OF CORRECTION

PATENT NO.   : 6,081,614
DATED        : June 27, 2000
INVENTOR(S)  : YUICHI YAMADA, ET AL.

It is certified that error appears in the above-identified patent and that said Letters Patent is hereby corrected as shown below:

COLUMN 12:
    Line 24, "called" should be deleted.

COLUMN 14:
    Line 45, "Position" should read --position--.
    Line 63, "at" should be deleted.

Signed and Sealed this

Seventeenth Day of April, 2001

Attest:

NICHOLAS P. GODICI

Attesting Officer    Acting Director of the United States Patent and Trademark Office